(No Model.)

J. A. DEVANTERY.
MOLD FOR FORMING GAME COUNTERS.

No. 469,345. Patented Feb. 23, 1892.

WITNESSES:
CR Ferguson
Wm McIlhiff

INVENTOR
Joseph A. Devantery

BY Edwin S. Brown HIS ATTY.

United States Patent Office.

JOSEPH A. DEVANTERY, OF BROOKLYN, ASSIGNOR TO EDITH SAELTZER, OF NEW YORK, N. Y.

MOLD FOR FORMING GAME-COUNTERS.

SPECIFICATION forming part of Letters Patent No. 469,345, dated February 23, 1892.

Application filed April 28, 1891. Serial No. 390,877. (No model.)

*To all whom it may concern:*

Be it known that I, JOSEPH A. DEVANTERY, of Brooklyn, Kings county, and State of New York, have invented a certain new and useful Improvement in Molds for Forming Game-Counters, of which the following is a specification.

My improvement relates to game-counters which have different portions made of different plastic materials. In the sense in which I speak of "different materials" I mean to include materials of the same kind differently colored.

Figure 1:
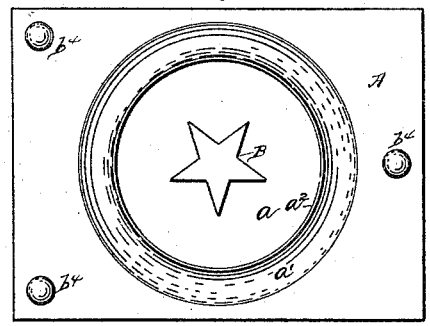
Figure 2:
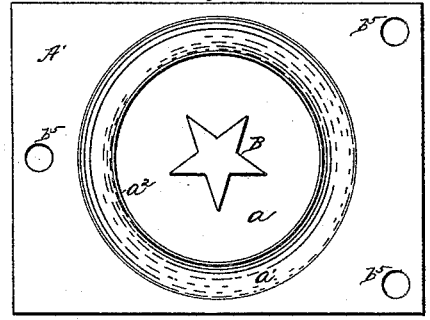
Figure 3:
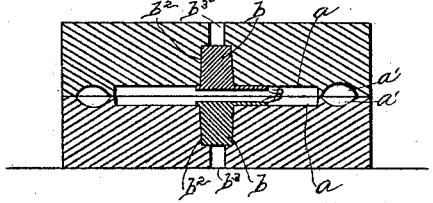

In the accompanying drawings, Figure 1 is a face view of one portion of a mold embodying my improvement. Fig. 2 is a face view of the opposite side thereof. Fig. 3 is a section of the two portions of the mold in position. Figs. 4, 5, 6, 7, 8, and 9 show the portions of a counter in different stages of construction.

Referring first to Figs. 1, 2, and 3, the mold-sections A A' are shown as similar in form. Each section has a molding-cavity $a$ and a waste-cavity $a'$. The waste-cavities are shown as surrounding the molding-cavities, and between each molding-cavity and its waste-cavity is a cutting-edge $a^2$.

B designates a central ornament, which is here shown in the form of a star, and I have shown each mold-section provided with the ornament; but it is obvious that the ornament may be of any desired form and that only one section of the mold need be provided with the ornament. The ornament B is preferably removable from the mold-section, and as a means for removably securing said ornament to the mold-section the same has a taper boss $b$ on its rear surface, which fits snugly into a corresponding opening $b^2$ in the mold-section. This opening $b^2$ has an outward opening $b^3$, through which an instrument may be inserted when it is desired to remove the ornament. One section of the mold is furnished with pins or projections $b^4$, designed to enter holes $b^5$ in the other section for the purpose of properly centering the sections.

Figure 4:
Figure 6:
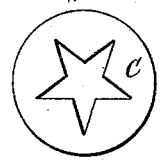
Figure 5:
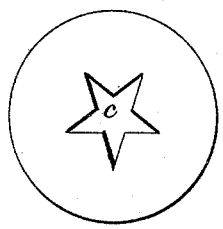
Figure 8:
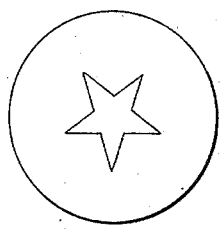

It is obvious that when soft plastic material, of which the counters are formed, is placed within the cavity $a$ of the mold-sections and the said sections forced together in a suitable press the material will be forced into all portions of the cavities $a$, and each face of the counter will have a cavity in it corresponding in shape to the ornament B. The counter, when removed from the mold, will be in the form shown in Fig. 5, in which $c$ represents the ornament-cavity in one of its faces. A previously-prepared ornament—such as shown in Fig. 4—is then inserted into the cavity $c$ and the whole subjected to pressure in a finishing-mold, which will result in a finished counter such as that shown in Fig. 8.

It may be desirable to form a counter showing different colors or materials on its faces. In this event I insert in each mold-section a piece of material C, having an opening through it corresponding to the ornament B. The opening in the piece C of course surrounds the ornament B. Plastic material is then placed in the cavities $a$ and the sections forced together, as before stated. When the counter is removed from the mold, it will be in the form shown in Fig. 7, having the cavity $d$ for the ornament shown in Fig. 4, which is inserted and the whole subjected to pressure in a finishing-mold, resulting in the finished counter. (Shown in Fig. 9.)

Figure 7:
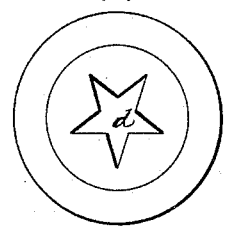
Figure 9:
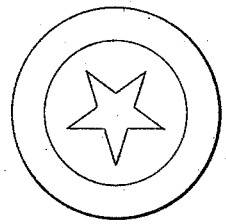

When it is desired to form a counter having its central ornament of the same color and material as the body and outer rim of the counter, the counter in the condition shown in Fig. 7 is placed in a finishing-mold and subjected to sufficient pressure to force the body material into the openings $d$.

The body of the counter, as before stated, is of plastic material. The ornaments shown in Figs. 4 and 6 may, however, be made of any desired sheet material, such as metal, ivory, &c.

Having described my invention, what I claim is—

In a mold for forming game-counters, the combination of two sections, each having a molding-cavity and an ornamental portion for one or both of said mold-sections, said ornament having a taper boss removably seated in a corresponding opening in the mold-section and said opening having an outward opening, substantially as specified.

In testimony whereof I have signed my name to this specification in the presence of two subscribing witnesses.

JOSEPH A. DEVANTERY.

Witnesses:
S. O. EDMONDS,
C. R. FERGUSON.